United States Patent
Hishida

(10) Patent No.: US 8,961,734 B2
(45) Date of Patent: Feb. 24, 2015

(54) PROCESSING METHOD OF METAL PRODUCT SURFACE

(76) Inventor: Iwao Hishida, Toyonaka (JP)

(*) Notice: Subject to any disclaimer, the term of this patent is extended or adjusted under 35 U.S.C. 154(b) by 220 days.

(21) Appl. No.: 13/185,988

(22) Filed: Jul. 19, 2011

(65) Prior Publication Data
US 2012/0018092 A1  Jan. 26, 2012

(30) Foreign Application Priority Data

Jul. 21, 2010 (JP) ................... 2010-163754

(51) Int. Cl.
| | | |
|---|---|---|
| B29C 65/52 | (2006.01) | |
| B32B 15/14 | (2006.01) | |
| B32B 7/12 | (2006.01) | |
| B32B 15/18 | (2006.01) | |
| B32B 33/00 | (2006.01) | |
| B32B 37/12 | (2006.01) | |

(52) U.S. Cl.
CPC . *B32B 15/14* (2013.01); *B32B 7/12* (2013.01); *B32B 15/18* (2013.01); *B32B 33/00* (2013.01); *B32B 2255/06* (2013.01); *B32B 2255/26* (2013.01); *B32B 2255/28* (2013.01); *B32B 2260/021* (2013.01); *B32B 2262/0276* (2013.01); *B32B 2262/04* (2013.01); *B32B 2262/062* (2013.01); *B32B 2307/21* (2013.01); *B32B 2307/56* (2013.01); *B32B 2307/714* (2013.01); *B32B 2307/752* (2013.01); *B32B 37/12* (2013.01); *B32B 2305/18* (2013.01); *B32B 2311/30* (2013.01)
USPC .................... 156/308.2; 156/314

(58) Field of Classification Search
USPC .......... 156/60, 308.2, 314, 315, 308.8, 308.6, 156/310, 309.3; 52/783.1
See application file for complete search history.

(56) References Cited

U.S. PATENT DOCUMENTS

| | | | | |
|---|---|---|---|---|
| 4,884,615 A | * | 12/1989 | Hsu ............................... | 160/236 |
| 5,136,761 A | * | 8/1992 | Sternlieb et al. ............... | 28/104 |
| 5,178,916 A | | 1/1993 | Chidsey et al. | |
| 5,849,110 A | * | 12/1998 | Blohowiak et al. ........... | 148/247 |
| 6,740,173 B1 | | 5/2004 | Pouyfaucon et al. | |
| 2002/0014296 A1 | * | 2/2002 | Corey ........................... | 156/73.4 |

(Continued)

FOREIGN PATENT DOCUMENTS

| | | |
|---|---|---|
| CN | 101508851 A | 8/2009 |
| EP | 0 492 158 A2 | 7/1992 |

(Continued)

OTHER PUBLICATIONS

Suga Kazuhiro, Laminate, Aug. 5, 2002, Japanese Patent.*

(Continued)

*Primary Examiner* — Jacob T Minskey
*Assistant Examiner* — Vishal I Patel
(74) *Attorney, Agent, or Firm* — Sughrue Mion, PLLC

(57) ABSTRACT

A method for processing a surface of a metal product is provided, the method including: a rust prevention method of a metal product surface; a method of reducing the electric conductivity of a metal product surface and removing the feeling of discomfort or fear caused by the discharge of static electricity; and a method of preventing one from suffering burns when one carelessly touches a heated metal product by providing adiabaticity to a metal product surface.

A rust preventive paint 2 is applied to a metal product surface 1 and a fabric 4 is attached onto the rust preventive paint 2 with an adhesive 3.

16 Claims, 2 Drawing Sheets

(56) References Cited

U.S. PATENT DOCUMENTS

| | | | |
|---|---|---|---|
| 2002/0152716 A1* | 10/2002 | Clifford | 52/783.1 |
| 2010/0028671 A1* | 2/2010 | Mitsui et al. | 428/354 |
| 2010/0166967 A1* | 7/2010 | Fasano | 427/385.5 |

FOREIGN PATENT DOCUMENTS

| | | |
|---|---|---|
| JP | 60-137536 U | 9/1985 |
| JP | 60-203680 A | 10/1985 |
| JP | 4-197748 A | 7/1992 |
| JP | 7-048683 A | 2/1995 |
| JP | 10-146907 A | 6/1998 |
| JP | 11-071536 A | 3/1999 |
| JP | 2000-017198 A | 1/2000 |
| JP | 2000-177054 A | 6/2000 |
| JP | 2002-127307 A | 5/2002 |
| JP | 2003-527456 A | 9/2003 |
| JP | 2005-238001 A | 9/2005 |
| JP | 2007-260725 A | 10/2007 |
| WO | WO 01/12434 A1 | 2/2001 |
| WO | WO 2005/110736 A2 | 11/2005 |
| WO | WO 2006-059872 * | 6/2006 ............... C09C 5/10 |

OTHER PUBLICATIONS

Chinese Office Action issued in Chinese Application No. 201110201788.9 issued Jul. 2, 2012.

* cited by examiner (a)

(b)

PROCESSING METHOD OF METAL PRODUCT SURFACE

BACKGROUND OF THE INVENTION

1. Field of the Invention

The present invention relates to a processing method of a metal product surface; and more specifically to methods for preventing a metal product surface from rusting, inhibiting static electricity on a metal product surface from discharging, and providing adiabaticity to a metal product surface.

2. Description of the Related Art

Model changes are carried out often in the field of metal products such as conveyance including an automobile, an electric train, an aircraft, a bus, and a ship; iron and steel products including a bridge, an iron plate, an iron pole, and a guardrail; household products including a laundry rack, a handle, and a wagon; water-related products including a faucet; and agricultural machines including a tractor and a cultivator. The preference of users changes with the lapse of time, and the purpose of the model changes is to cope with the changes of the preference.

It has heretofore been known that, when the design of a metal product is changed for example, a metal plate material constituting the surface is processed into a desired shape (for example, Patent Document 1). It has not been easy, however, to change the appearance of a metal product after it had once been processed.

Further, a metal product of recent years has a better durability than a conventional one; and frequently continues to be used for a long period of time depending on the maintenance on the side of manufacturers and the usage by users. On this occasion, surface treatment of forming a film (for example, Patent Documents 2 and 3) or applying plating of chromium, a transition metal, or the like (for example, Patent Document 4) is applied in order to prevent the deterioration of physical properties or damages caused by the corrosion of a metal product surface. However, a film and plating always have possibilities of breakage, cracking, and exfoliation caused by an impact, and efforts have been made still now to reduce the possibility of corrosion and prevent surface damages by devising the type of a chemical compound used as such a film or the type of metal used for plating.

Furthermore, a technology of applying an anticorrosive paint composition to the surface of a metal product (Patent Documents 5 and 6) and a technology of drawing a design on a surface with paint have been known well. The technologies however have: not only the cumbersomeness of the complicated operation process and the necessity of many process steps until finishing, a high susceptibility to the damages of a metal product surface during coating, or requirement of proficiency for beautifully finishing a coated surface; but also the problems of the cracking and exfoliation of paint. Consequently, in an automobile for example, it has been necessary to apply washing and waxing to a coated surface very frequently.

Moreover, in the conventional surface treatment such as plating and coating, once the surface treatment has been applied, a pattern or the like formed on the surface cannot be changed easily. Further, in the conventional processing technology of a metal surface, generally a surface is smoothened from the viewpoint of removing stains more easily in the event of washing and therefore the designability of a metal product has been restricted also from this viewpoint.

In addition, since a metal has a good electric conductivity, electric charge (static electricity) accumulated in a human body particularly under a low-temperature low-humidity environment such as during winter season causes feeling of discomfort or fear such as zap when electric discharge occurs by touching a metal product, and various goods have been proposed in order to prevent such feeling. Furthermore, another drawback is that, since a metal has a high thermal conductivity, one may suffer burns if one carelessly touches a heated metal product such as a faucet for serving hot water or a kettle for boiling water. All the contents disclosed in the following documents are incorporated herein by reference.

PRIOR ART DOCUMENTS

Patent Literature

Patent Document 1: JP 2007-260725 A
Patent Document 2: JP 2003-527456 A
Patent Document 3: JP 11-71536 A
Patent Document 4: JP 7-48683 A
Patent Document 5: JP 2000-017198 A
Patent Document 6: JP 2005-238001 A

SUMMARY OF THE INVENTION

An object of the present invention is, in view of the above circumstances, to provide a method that permits change of not only the appearance of a metal product surface but also the design including tactile impression such as hand feeling, and improves the aforementioned various drawbacks by improving various physical properties of the metal product surface without the use of plating, coating, or waxing, the method including: a processing method of a metal product surface; a rust prevention method of a metal product surface; a method of reducing the electric conductivity of a metal product surface and removing the feeling of discomfort or fear caused by the discharge of static electricity; and a method of preventing one from suffering burns when one carelessly touches a heated metal product by imparting adiabaticity to a metal product surface.

The present inventors have earnestly studied a processing method of a metal product that is different from the conventional surface treatment such as plating, coating, or waxing; have found that the above various problems can be solved at once by attaching a fabric to the surface of a metal product with an adhesive after applying a rust preventive paint to the surface of the metal product; and have completed the present invention.

That is, the present invention is related to (1) a processing method of a metal product surface characterized by applying a rust preventive paint to the surface of the metal product and attaching a fabric onto the rust preventive paint with an adhesive, (2) a rust prevention method of a metal product surface characterized by applying a rust preventive paint to the surface of the metal product and attaching a fabric onto the rust preventive paint with an adhesive, (3) a method for inhibiting the discharge of static electricity on a metal product surface and removing the feeling of discomfort or fear caused by shock at the discharge of static electricity when one touches a metal product, by applying a rust preventive paint to the surface of a metal product and attaching a fabric onto the rust preventive paint with an adhesive, and (4) a method of providing adiabaticity to a metal product surface and preventing one from suffering burns when one carelessly touches a heated metal product, by applying a rust preventive paint to the surface of a metal product and attaching a fabric onto the rust preventive paint with an adhesive.

The present invention makes it possible to obtain the following advantageous effects by applying a rust preventive paint to the surface of a metal product and attaching a fabric onto the rust preventive paint with an adhesive.

(1) Decoration Effect

By attaching a fabric onto the surface of a metal product, it is possible to decorate with the fabric the surfaces of various metal products represented by: conveyance including an automobile, an electric train, an aircraft, a bus, and a ship; iron and steel products (structures) including a pier, a bridge, an iron plate, an iron pole, and a guardrail; household products including a laundry rack, a handle, and a wagon; water-related products including a faucet in a kitchen or a bathroom; and agricultural machines including a tractor and a cultivator, and change designs including not only the appearance but also the tactile impression such as hand feeling of the metal product surface. Further, by combining fabrics of various colors and patterns or using a fabric having a complex pattern, it is possible to apply various designs to the surface of a metal product and remarkably improve the designability of the surface of the metal product, which has heretofore had a smooth surface generally.

(2) Damage Preventive Effect of Metal Product Surface

By attaching a fabric onto the surface of a metal product, it is possible to prevent the metal product surface from damaging.

(3) Method of Preventing Dirt/Discoloration

By attaching a fabric onto the surface of a metal product, it is possible to prevent the metal product surface from dirt and discoloration.

(4) Omission of Surface Treatment Such as Plating of Metal Product Surface

By attaching a fabric onto the surface of a metal product, surface treatment or care of the metal product such as plating or waxing, which have heretofore been applied, can be omitted.

(5) Effect of Preventing Cracking/Exfoliation of Coating

By attaching a fabric onto the surface of a metal product, problems such as cracking/exfoliation of coating can be avoided.

(6) Rust Preventive Effect

By applying a rust preventive paint to the surface of a metal product and then attaching a fabric with an adhesive, it is possible to remarkably improve rust preventive effect in comparison with the case of merely applying a rust preventive paint or with the case of applying a finishing paint onto a rust preventive paint, and a method according to the present invention is useful as a surface rust prevention method for not only an ordinary metal product but also a metal product, such as a ship, a pier, a buoy, or the like, always exposed to seawater or sea wind (sea breeze).

(7) Effect of Preventing Shock (Feeling of Discomfort and Fear) at Discharge of Static Electricity By attaching a fabric onto the surface of a metal product, it is possible to inhibit static electricity accumulated in a human body from being discharged toward the metal product, alleviate shock at the discharge of static electricity caused by touching the metal product, and remove the feeling of discomfort and fear.

(8) Effect of Providing Adiabaticity

Since a metal has a good thermal conductivity, a metal product is prone to be heated by the sun and a temperature in an automobile rises allegedly up to 60° C. or higher under the burning sun in midsummer for example. Further, there is a danger of suffering burns if one carelessly touches a metal product such as a faucet heated by hot water. In this context, by the present invention, by attaching a fabric onto the surface of a metal product, it is possible to impart adiabaticity to the surface of the metal product and prevent occurrence of an accident such as burns which one suffers when one carelessly touches a heated metal product. Furthermore, by attaching a fabric onto the surface of a metal product in accordance with the present invention, a heat-insulating and heat-shielding effect is exhibited to inhibit the rise of temperatures on the surface and in the interior of the metal product.

(9) Vibration Reducing Effect

By attaching a fabric onto the surface of a metal product, vibration is reduced and the cracking and exfoliation of a rust preventive paint and adhesive can be prevented. Further, deterioration of the physical properties of a metal product itself can be prevented. Furthermore, even a product using a metal product processed by a method according to the present invention can exhibit a sound insulating effect.

Figure 1:
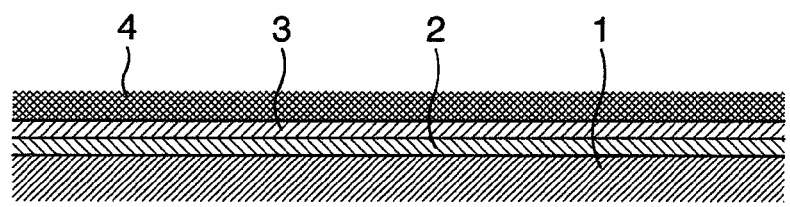
FIG. 1 is an explanatory sectional view showing a metal product surface onto which a fabric is attached.

MODE FOR CARRYING OUT THE INVENTION (1) The processing method of a metal product surface, (2) the rust prevention method of a metal product surface, (3) the method of removing the feeling of discomfort and fear caused by shock at the discharge of static electricity by inhibiting the discharge of static electricity on a metal product surface, and (4) the method of providing adiabaticity to a metal product surface and preventing one from suffering burns when one touches a heated metal product, all according to the present invention are common to each other on the point that the methods are characterized by applying a rust preventive paint 2 to a metal product surface 1 and attaching a fabric 4 with an adhesive 3 onto the rust preventive paint 2 as shown in FIG. 1. Consequently, the details of the invention of (1) to (4) are hereunder explained collectively as "the method according to the present invention".

In the methods according to the present invention, a metal product to which a fabric is attached is not particularly limited as long as the metal product has a surface made of a metal. The examples are: conveyance including an automobile, an electric train, an aircraft, a bus, and a ship; iron and steel products (structures) including a pier, a bridge, an iron plate, an iron pole, and a guardrail; water-related products including a faucet in a kitchen or a bathroom; household products including a laundry rack, a handle, and a wagon; agricultural machines including a tractor and a cultivator; and daily commodities including a desk, a chair, and writing implements. Further, the type of the metal for the metal product is not particularly limited, and iron, stainless steel, aluminum, and other various metals can be used. Of these metals, however, iron or the like that is less expensive and easily processed but prone to corrode (generate rust) can enjoy the outstanding benefits by the present invention. A particularly suitable is an iron or steel plate.

In the present invention, a fabric attaching onto the surface of the metal product is not particularly limited and an ordinary textile or knit may be used. A textile is a cloth made by combining yarn longitudinally and latitudinally and a knit is a cloth made usually from a yarn. Further, the fabric may be a napped or flocked fabric. A napped fabric is a cloth fluffed by brushing the surface of a textile or knit with a metal brush or the like. A flocked fabric is a cloth made by embedding or adhering short fibers to a ground fabric comprising a textile or a knit. In the case of a flocked fabric, an adhesive may be used for adhering short fibers. The fiber used as a material of the fabric is not particularly limited and the examples are synthetic fibers including nylon, polyurethane, polyester, and spandex; natural fibers including cotton, silk, hemp, and wool; and regenerated fibers including rayon and regenerated polyester.

With regard to the fabric, such as a textile or a knit, used in the present invention, way of weaving, way of knitting, and the mesh of the fabric are not particularly limited, but, as it will be stated later, a dense fabric is preferable to a coarse fabric in order to make an adhesive used for adhering the fabric hardly exude through the mesh toward the surface of the fabric. Further, a thicker fabric is preferable from the viewpoint of providing adiabaticity.

Concrete examples of a fabric are stockinet cotton, corduroy cotton, velveteen cotton, a polyester plain-woven fabric, a polyester napped fabric, a cotton napped fabric, a nylon flocked fabric, a rayon flocked fabric, a wool flocked fabric, buckskin, an acrylic napped fabric, umbrella cloth, raincoat cloth, and a spandex fabric.

Further, it is also possible to use a fabric subjected to water repellent treatment or waterproof treatment from the viewpoint of dirt prevention, anticorrosiveness, and others. As water repellent treatment or waterproof treatment, the surface of a fabric may be applied with a known water repellent agent or waterproofing agent. The type of a water repellent agent or a waterproofing agent to be used may suitably be selected in accordance with a target fabric. Further, it is also possible to constitute the surface of a fabric itself with a water repellent or waterproofing synthetic fiber or the like. Moreover, print processing and antistatic processing may be applied.

In a method according to the present invention, the surface of a metal product is applied with a rust preventive paint and then covered with a fabric by attaching the fabric with an adhesive. It is possible to attach a fabric either onto the whole surface of a metal product or only onto a part thereof as occasion demands.

The rust preventive paint used in the present invention is not particularly limited, and the examples are organic rust preventive paint of oil-based series, alkyd resin series, phenol series, epoxy series, and urethane series; and inorganic rust preventive paint using a binder such as a silicate binding agent. Of these, an organic rust preventive paint containing anticorrosive pigment and an epoxy resin is preferably used from the viewpoint of cost, operability, adhesiveness between the adhesive and a metal, and others.

The adhesive used in the present invention is not particularly limited and may suitably be selected in consideration of adhesiveness between the rust preventive paint and the fabric. For example, a reaction-curable adhesive, a rubber-based adhesive, and a thermoplastic adhesive can be used.

Examples of a reaction-curable adhesive are materials containing a major amount of an epoxy resin, a urethane resin, an acrylic resin, and others. Examples of a rubber-based adhesive are materials containing a major amount of chloroprene rubber, styrene butadiene rubber (SBR), IR, NBR, and others. Examples of a thermoplastic adhesive are materials containing a major amount of an ethylene-vinyl acetate copolymer, chlorinated polypropylene, interpolyamide, polyvinyl formal, and others. Of these, an adhesive that is soft and provides a highly viscous film is preferably used from the viewpoint of not exuding onto the surface of a fabric, not hindering designability by a fabric, and obtaining a static electricity discharge prevention effect and an adiabatic effect by a fabric. Specifically, preferable examples are an epoxy-based adhesive, a urethane-based adhesive, an acrylic-based adhesive, an olefin-based adhesive, and further a rubber-based adhesive such as chloroprene rubber. Further, from the viewpoint of providing adiabaticity to a metal product surface, a reaction-curable adhesive that hardly softens by heat is preferably used.

As a coating method of the rust preventive paint or the adhesive, any method is acceptable, and the examples are brush coating, roll coating, and splay coating. The quantity of the rust preventive paint or the adhesive for coating is not particularly limited, and any quantity is acceptable as long as the quantity is sufficient to adhere (firmly fix) a fabric to the surface of a metal product without exfoliation. However, it is preferable to apply coating so that the rust preventive paint or the adhesive may be applied to the entire surface of a fabric covering a metal product surface. Further, since the discharge prevention effect or the adiabaticity providing effect caused by a fabric may sometimes be hindered if an adhesive exudes onto the surface of the fabric, it is preferable to attach the fabric by pressure after coating and drying the fabric to the extent of not exuding the adhesive onto the surface of the fabric.

In the methods according to the present invention, firstly the surface of a metal product is coated with a rust preventive paint, dried, and then an adhesive is coated the rust preventive paint. Successively, a fabric is attached onto the metal product surface by pressure. On this occasion, the adhesive is preferably in the state of half dry. A half-dry state means a state where an adhesive is not completely dried. If an adhesive is dried completely, the adhesiveness between a metal product surface and a fabric would be insufficient and thus undesirable. In contrast, if a fabric is attached by pressure immediately after the coating of an adhesive, the adhesive may exude onto the surface of the fabric in some cases and hence care must be taken. Means of attaching a fabric by pressure is not particularly limited as long as the means does not damage a metal product and the fabric. For example, either a fabric may be pushed toward a metal product surface directly with hand or there may be used an apparatus, such as a roller or a pressing machine, to press the fabric to the metal product. Preferably, by leaving the metal product at rest for a certain period of time after the press, a fabric adheres to the metal product surface.

As stated above, according to the methods of the present invention, by coating the surface of a metal product with a rust preventive paint and then attaching a fabric with an adhesive, it is possible to give designability by the fabric to the metal product; to remarkably improve the rust preventive effect of the metal product surface in comparison with the case of merely applying a conventional rust preventive paint or finishing paint; to remove the feeling of discomfort and fear caused by the discharge of static electricity; and to obtain the effect of preventing burns by providing adiabaticity to the metal product surface by the fabric.

EXAMPLES

The examples (test examples) of the present invention are shown hereunder, but the present invention is not limited to the examples. Here, the fabrics used hereunder are ordinary fabrics purchased from Toraya Syouten Co., Ltd. in Shin-Osaka Sen'i City.

Test Example 1

Adhesion Test of Rust Preventive Paint to Iron Plate Surface

After an iron plate surface was cleaned with methanol, the iron plate was coated with each of three kinds of rust preventive paints A, B, and C shown in Table 1 below, into the thickness of about 0.2 mm with a blush, and thereafter dried for 6 hours at 40° C. in a drying room. After the drying, adhesion test was carried out by cross-cut peeling method. The results are shown in Table 1.

TABLE 1

Adhesion test of rust preventive paint to iron plate surface

|  | Rust preventive paint A | Rust preventive paint B | Rust preventive paint C |
|---|---|---|---|
| Component | Epoxy resin | Vinylated alkyd resin | Phenol-modified alkyd resin |
| Manufacturer's name | Asahipen Corporation | Arakawa Chemical Industries, Ltd. | Arakawa Chemical Industries, Ltd. |
| Product name | Ultra-quick-drying rust preventive | Arakyd M-302 | Arakyd 7100x-50 |
| Adhesion test result | Good | Good | Good |

As shown in Table 1, in any of the rust preventive paints, the adhesiveness to an iron plate was good.

Test Example 2

Adhesiveness of Fabric to Iron Plate Surface with Rust Preventive Paint

In the same manner as in Test Example 1, the surface of an iron plate was coated with the rust preventive paint A, and then, the iron plate was dried for 1 hour at 40° C. in a drying room. Then, fabrics (those being plain-woven) made of each of cotton, rayon, and polyester were attached by pressure onto the paint surface in a half-drying state. After leaving the iron plate for one month at room temperature, the following peeling test was carried out. The results are shown in Table 2.

Peeling Test Method

Figure 2:
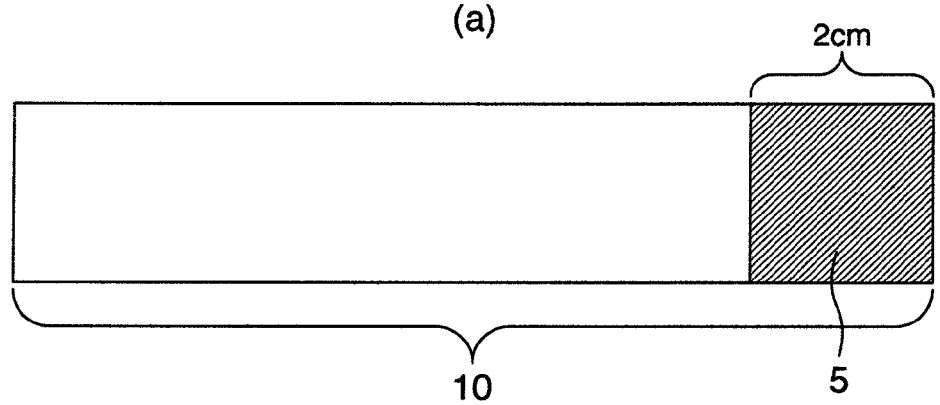
FIGS. 2A and 2B are explanatory views of a peeling test method and show a plan view and a side view, respectively.
Figure 2:
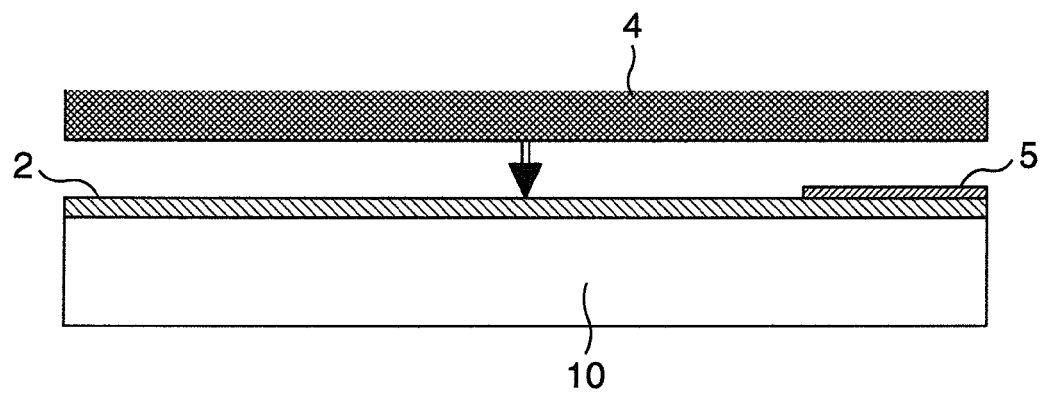

As shown in FIG. 2, the area 2 cm in width from an edge of the surface of an iron plate 10 coated with a rust preventive paint 2 over the entire surface was covered with a polyethylene film 5, and then a fabric 4 was attached by pressure onto the surface of the iron plate 10. After leaving the iron plate for one month, the edge of the fabric 4 not adhering to the iron plate 10 by interposing the polyethylene film 5 was pulled to see whether or not the fabric 4 peels off from the iron plate 10.

TABLE 2

Adhesiveness of fabric to iron plate surface with rust preventive paint

|  | Cotton | Rayon | Polyester |
|---|---|---|---|
| Adhesiveness | Peeling off easily | Peeling off easily | Peeling off easily |

As shown in Table 2, the fabrics could not surely be attached to the surface of an iron plate only with a rust preventive paint.

Test Example 3

Adhesiveness Between Adhesive and Fabric

The surface of various fabrics made of each of cotton, rayon, and polyester (those being plain-woven) was coated with various adhesives shown in Table 3 below, and the adhesiveness was investigated. The adhesiveness was evaluated in the same manner as in Test Example 2 shown in FIG. 2 by covering the area 2 cm in width from the edge of a fabric with a polyethylene film, pulling the end of the fabric where the polyethylene film was interposed and an adhesive was not attached to see whether or not the coated film of the adhesive peels off.

TABLE 3

Adhesiveness between fabric and adhesive

| Component | Adhesive Product name | Manufacturer | Cotton | Rayon | Polyester |
|---|---|---|---|---|---|
| Urethane resin | UM700 | Cemedine Co., Ltd. | ◎ | ◎ | ◎ |
|  | Nunocchi | Henkel Japan Ltd. | ◎ | ◎ | ◎ |
| Styrene-butadiene rubber | TA34 | Sumitomo 3M Limited | Δ | X | X |
|  | Nalstar SR-103 | Nippon A&L Inc. | Δ | Δ | Δ |
| Chloroprene rubber | Aqueous G | Konishi Co., Ltd. | ○ | ○ | ○ |
|  | G10Z | Konishi Co., Ltd. | Δ~○ | Δ~○ | Δ~○ |
| Nitrile rubber | G103 | Konishi Co., Ltd. | ○ | ○ | ○ |
|  | Diabond 1880 | Nogawa Chemical Co., Ltd. | Δ~○ | Δ~○ | Δ~○ |
| Modified silicon resin | PM165 | Cemedine Co., Ltd. | Δ | Δ | Δ |
| Polyester resin | Y-6500 | The Yokohama Rubber Co., Ltd. | Δ | Δ | Δ |
| Ethylene-vinyl acetate copolymer | Polysol P-62N | Showa Kobunshi K.K. | ◎ | ◎ | ◎ |

◎: Very high adhesiveness
○: High adhesiveness
Δ: Low adhesiveness

X: Peeling off easily

Test Example 4

Adhesiveness Between Fabric and Iron Plate with Adhesive

Adhesiveness to an iron plate was investigated by using the adhesives shown in Table 4 below, each of those having a good adhesiveness with the fabrics in the result of Test Example 3. The results are shown in Table 4.

TABLE 4

Adhesiveness to iron plate with adhesive having good adhesiveness to fabric

| Adhesive type | Product name | Adhesiveness | |
|---|---|---|---|
| Urethane resin | UM700 | Cotton | X |
|  |  | Rayon | X |
|  |  | Polyester | X |

TABLE 4-continued

Adhesiveness to iron plate with adhesive having good adhesiveness to fabric

| Adhesive type | Product name | Adhesiveness | |
|---|---|---|---|
| | Nunocchi | Cotton | X |
| | | Rayon | X |
| | | Polyester | X |
| Chloroprene rubber | Aqueous G | Cotton | X |
| | | Rayon | X |
| | | Polyester | X |
| Nitrile rubber | G103 | Cotton | X |
| | | Rayon | X |
| | | Polyester | X |
| Ethylene-vinyl acetate copolymer | Polysol P-62N | Cotton | Δ |
| | | Rayon | Δ |
| | | Polyester | Δ |

◎: Very high adhesiveness
○: High adhesiveness
Δ: Low adhesiveness
X: Peeling off easily As shown in Table 4, it was found that even an adhesive having a good adhesiveness to a fabric was not easily attached to an iron plate.

Test Example 5

Adhesiveness Between Fabric and Iron Plate Attaching to Each Other with Rust Preventive Paint and Adhesive An iron plate was coated with the epoxy-based rust preventive paint A (Asahipen Corporation, product name "Ultra-quick-drying rust preventive", main components: synthetic resin, epoxy resin, pigment, rust preventive agent, and organic solvent), dried for 6 hours at 40° C., and successively coated with each of the adhesives having a good adhesiveness to the fabrics in Test Example 3. Then, various fabrics were attached by pressure, the adhesives were dried, and the adhesiveness was estimated. The results are shown in Table 5.

TABLE 5

Adhesiveness between iron plate and fabric with rust preventive paint and adhesive

| Rust preventive paint | Type of adhesive | Product name | Adhesiveness | |
|---|---|---|---|---|
| Epoxy-based (Asahipen Corporation: Ultra-quick-drying rust preventive) | Urethane resin | UM700 | Cotton | ○ |
| | | | Rayon | ○ |
| | | | Polyester | ○ |
| | Chloroprene rubber | Aqueous G | Cotton | ○ |
| | | | Rayon | ○ |
| | | | Polyester | ○ |
| | Nitrile rubber | G103 | Cotton | ○ |
| | | | Rayon | ○ |
| | | | Polyester | ○ |
| | Ethylene-vinyl acetate copolymer | Polysol P-62N | Cotton | ◎ |
| | | | Rayon | ◎ |
| | | | Polyester | ◎ |

◎: Very high adhesiveness
○: High adhesiveness
Δ: Low adhesiveness
X: Peeling off easily From the results of Test Examples 1 to 5, it was found that a high adhesiveness between an iron plate and a fabric is obtained by coating the iron plate with a rust preventive paint and then attaching the fabric with an adhesive.

Test Example 6

Rust Preventive Effect by Attaching Fabric to Iron Plate

Figure 3:
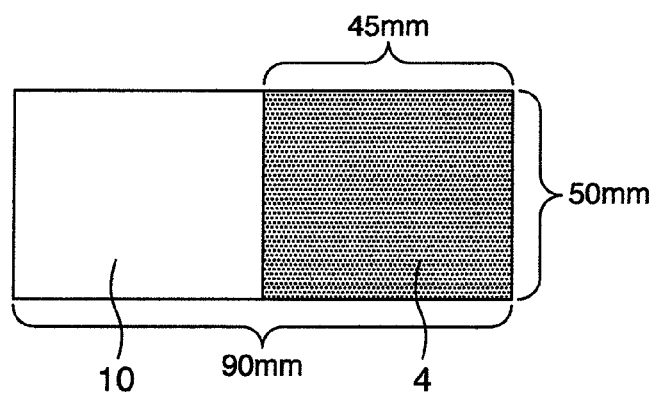
FIG. 3 is a plan view showing a test piece for rust-proof test.

The surface of an iron plate 10 having a thickness of 0.4 mm was coated with the epoxy-based rust preventive paint A (Asahipen Corporation, product name "Ultra-quick-drying rust preventive") about 0.2 mm in thickness and thereafter dried for 6 hours at 40° C. After the drying, a half of the surface of the iron plate 10 was coated with a urethane-based adhesive (Cemedine Co., Ltd., product name "UM700"), various fabrics 4 were attached by pressure and dried, and thereby test pieces were produced (See FIG. 3).

Each of the test pieces was dipped in a salt solution having a concentration (salt concentration 3.4 weight %) nearly identical to seawater for 6 hours from 8 o'clock in the morning to 14 o'clock and thereafter subjected to sunshine weather meter test (400 hours test corresponds to one year of outdoor exposure) from 14 o'clock to 8 o'clock in the next morning with a fadeometer (Yasuda Seiki Seisakusyo Ltd., model number: No. 518). The processes were repeated for 7 to 21 days. The results are shown in Table 6.

TABLE 6

Rust preventive effect by attaching fabric

| | After 7 days | After 14 days | After 21 days |
|---|---|---|---|
| Only epoxy-based rust preventive paint | Partial rusting | Entire rusting | Paint blistering, partial exfoliation |
| Cotton (plain-woven) stuck | No change | No change | No change |
| Rayon (plain-woven) stuck | No change | No change | No change |
| Polyester (plain-woven) stuck | No change | No change | No change |
| Rayon (filled) stuck | No change | No change | No change |

As shown in Table 6, the rust preventive effect of a metal product surface was improved remarkably by attaching a fabric onto a rust preventive paint with an adhesive. As it is obvious from the results, the methods according to the present invention are effective as a surface rust prevention method of not only an ordinary metal product but also a metal product, such as a ship, a pier, or a buoy, always exposed to seawater and sea wind (sea breeze).

Test Example 7

Static Electricity Discharge Prevention Effect by Attaching Fabric to Iron Plate (1) Static Electricity Generation Method A pipe made of vinyl chloride resin (48 mm in outer diameter, 44 mm in inner diameter, and 40 cm in length) was charged to about 20 kV by rubbing the pipe with a woolen fabric 20 times. The potential to be charged varied depending on the temperature, humidity, and the like. Static electricity of a high potential was generated under the conditions of low humidity and low temperature.

(2) Electric Discharge Test to Iron Plate

When the vinyl chloride pipe charged in the above section (1) was made closer to an iron plate (0.45 mm in thickness, 50 mm in width, and 90 mm in length) at a distance of 1 to 3 cm, sparks were given off between the pipe and the iron plate, flash and noise were generated, and the electric potential came to be 0 V. The distance over which the sparks were given off varied depending on the electric potential. Under high temperature and humidity conditions (for example, weather: rain, room temperature: 27° C., and humidity: 60%), the generation of static electricity was weak (the quantity of charge was small) and weak sparks were given off when the pipe was made closer to the iron plate up to a distance of 1 cm. In contrast, under low temperature and humidity conditions (for example, weather: fine, room temperature: 25° C., and humidity: 43%), the generation of static electricity was strong (the quantity of charge was large) and strong sparks were given off when the pipe was made closer to the iron plate up to a distance of 2 to 3 cm. The following discharge test was carried out under low temperature and humidity conditions (strong sparks).

(3) Discharge Test to Iron Plate Coated With Rust Preventive Paint

The entire surface of an iron plate identical to the above section (2) was coated uniformly with the epoxy-based rust preventive paint A (Asahipen Corporation, product name "Ultra-quick-drying rust preventive") with a brush so as to give a dried film having a thickness of 30 μm, and the coated iron plate was dried for one day. Then, the discharge test was carried out in the same manner as in the section (2). As a result, strong discharge and spark sound were generated.

(4) Discharge Test to Iron Plate Coated with Rust Preventive Paint and Adhesive

Each of adhesives was applied further onto the epoxy-based rust preventive paint A of the above section (3), and the discharge test was carried out in the same manner as above. As the adhesives, a urethane-based adhesive (Cemedine Co., Ltd., product name "UM700") was applied so that the coated film thickness after dried may be 40 μm, and a chloroprene-based adhesive (Konishi Co., Ltd., "Konishi aqueous G") was applied so that the coated film thickness after dried may be 30 μm. As a result, strong discharge and spark sound were generated in the iron plate coated with any of the adhesives.

(5) Discharge Test to Iron Plate to Which Fabric is Attached

Various fabrics were stuck onto the epoxy-based rust preventive paint A of the above section (3) immediately after each of the adhesives of the above section (4) was applied, and dried for one day. Then, the discharge test was carried out in the same manner as above. The results are shown in Table 7, together with the results of the discharge tests of the sections (2) to (4).

TABLE 7

Discharge test result of static electricity

| No. | Construction of test piece | Discharge spark sound |
|---|---|---|
| 1 | Only iron plate | Strong |
| 2 | Iron plate + epoxy-based rust preventive paint A | Strong |
| 3 | Iron plate + epoxy-based rust preventive paint A + adhesive S | Strong |
| 4 | Iron plate + epoxy-based rust preventive paint A + adhesive K | Strong |
| 5 | Iron plate + epoxy-based rust preventive paint A + adhesive S + cotton (plain-woven) | Weak (note) |
| 6 | Iron plate + epoxy-based rust preventive paint A + adhesive S + rayon (plain-woven) | Nil |
| 7 | Iron plate + epoxy-based rust preventive paint A + adhesive S + polyester (plain-woven) | Nil |
| 8 | Iron plate + epoxy-based rust preventive paint A + adhesive K + cotton (plain-woven) | Nil |
| 9 | Iron plate + epoxy-based rust preventive paint A + adhesive K + rayon (plain-woven) | Nil |
| 10 | Iron plate + epoxy-based rust preventive paint A + adhesive K + polyester (plain-woven) | Nil |

Adhesive S: urethane-based adhesive (Cemedine Co., Ltd., product name "UM700")
Adhesive K: chloroprene rubber-based adhesive (Konishi Co., Ltd., "Konishi aqueous G")
(note) It seemed to be discharged, because the adhesive exuded onto the external surface of the fabric.

As shown in Table 7, discharge of static electricity onto an iron plate surface was avoided by attaching a fabric. Note that discharge may occur sometimes when an adhesive exudes onto the external surface of the fabric.

Test Example 8

Burn Prevention Effect by Attaching Fabric to Iron Plate

In the same manner as in Test Example 7 above, a test piece produced by coating an iron plate (0.45 mm in thickness, 50 mm in width, and 90 mm in length) only with the epoxy-based rust preventive paint A, a test piece produced by applying each of adhesives onto the epoxy-based rust preventive paint A, and a test piece produced by further attaching various fabrics with each of the above adhesives were heated for 10 minutes in hot water (100° C.), respectively, thereafter a time during which a finger could continue to touch the heated iron plate was measured, and thereby burn prevention effect by attaching a fabric was investigated. The results are shown in Table 8.

TABLE 8

Burn prevention effect by attaching fabric

| | | Touchable time measured | | | |
|---|---|---|---|---|---|
| No. | Construction of test piece | First run | Second run | Third run | |
| 1 | Only iron plate | X | X | X | X: Hot enough to suffer burns (untouchable) |
| 2 | Iron plate + epoxy-based rust preventive paint A | X | X | X | |
| 3 | Iron plate + epoxy-based rust preventive paint A + adhesive S | X | X | X | |
| 4 | Iron plate + epoxy-based rust preventive paint A + adhesive K | X*) | X*) | X*) | *) Adhesive softens and sticks by heat |
| 5 | Iron plate + epoxy-based rust preventive paint A + adhesive S + cotton (plain-woven: 0.3 mm thick) stuck | | 1 to 2 seconds | | |
| 6 | Iron plate + epoxy-based rust preventive paint A + adhesive S + rayon (plain-woven: 0.6 mm thick) stuck | 4 seconds | 4 seconds | 3 seconds | |
| 7 | Iron plate + epoxy-based rust preventive paint A + adhesive S + polyester (plain-woven: 0.7 mm thick) stuck | 8 seconds | 7 seconds | 7 seconds | |
| 8 | Iron plate + epoxy-based rust preventive paint A + adhesive K + cotton (plain-woven: 0.3 mm thick) stuck | | 1 to 2 seconds | | |
| 9 | Iron plate + epoxy-based rust preventive paint A + adhesive K + rayon (plain-woven: 0.6 mm thick) stuck | 5 seconds | 6 seconds | 4 seconds | |

TABLE 8-continued

Burn prevention effect by attaching fabric

| | | Touchable time measured | | |
|---|---|---|---|---|
| No. | Construction of test piece | First run | Second run | Third run |
| 10 | Iron plate + epoxy-based rust preventive paint A + adhesive K + polyester (plain-woven: 0.7 mm thick) stuck | 7 seconds | 5 seconds | 6 seconds |
| 11 | Iron plate + epoxy-based rust preventive paint A + adhesive S + cotton (flocked: 1.3 mm thick) stuck | 20 seconds or longer | 20 seconds or longer | 20 seconds or longer |
| 12 | Iron plate + epoxy-based rust preventive paint A + adhesive S + rayon (flocked: 0.7 mm thick) stuck | 8 seconds | 8 seconds | 5 seconds |
| 13 | Iron plate + epoxy-based rust preventive paint A + adhesive S + polyester (flocked: 1.0 mm thick) stuck | 10 seconds | 8 seconds | 5 seconds |
| 14 | Iron plate + epoxy-based rust preventive paint A + adhesive S + wool (flocked: 2.3 mm thick) stuck | Continuously touchable | | |
| 15 | Iron plate + epoxy-based rust preventive paint A + adhesive K + cotton (flocked: 1.3 mm thick) stuck | 15 seconds | 13 seconds | 14 seconds |
| 16 | Iron plate + epoxy-based rust preventive paint A + adhesive K + rayon (flocked: 0.7 mm thick) stuck | 8 seconds | 7 seconds | 6 seconds |
| 17 | Iron plate + epoxy-based rust preventive paint A + adhesive K + polyester (flocked: 1.0 mm thick) stuck | 8 seconds | 8 seconds | 7 seconds |
| 18 | Iron plate + epoxy-based rust preventive paint A + adhesive K + wool (plain-woven: 2.3 mm thick) stuck | Continuously touchable | | |

Adhesive S: urethane-based adhesive (Cemedine Co., Ltd., product name "UM700")
Adhesive K: chloroprene rubber-based adhesive (Konishi Co., Ltd., "Konishi aqueous G")

As it is obvious from the results shown in Table 8, by attaching a fabric, it was possible to prevent burns suffered when one touched the iron plate. Further, with regard to the attaching fabric, the thickness was more important than how the fabric was woven and other factors, and a sufficiently good adiabatic effect was obtained as long as the thickness of the fabric was at least 2.3 mm. Furthermore, adhesives that hardly soften by heat would preferably be used when adiabaticity is intended in order to prevent burns.

Test Example 9

Figure 4:
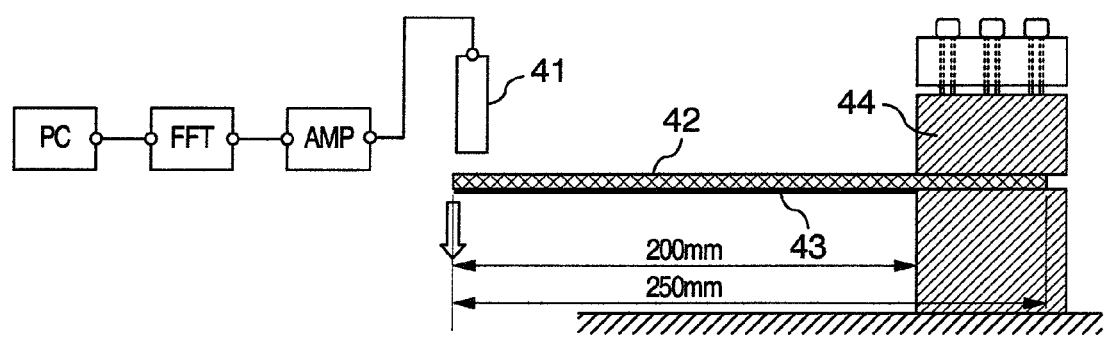
FIG. 4 is an explanatory view of a cantilever impact vibration method.
Figure 5:
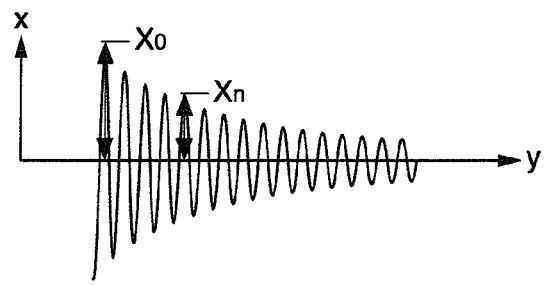
FIG. 5 is a view showing a damped free vibration waveform; x axis represents amplitude and y axis represents time.

Effects of Enhancing Attenuation of Vibration and Prevention of Noise by Attaching Fabric to Iron Plate The following materials were prepared.
Iron plate SS400 250 mm in length, 20 mm in width, and 0.6 mm in thickness
Fabric
Cotton 0.25 mm in thickness
Polyester 0.37 mm in thickness
Rayon 0.36 mm in thickness
Those are purchased at Toraya Syouten Co., Ltd. in Shin-Osaka Sen'i City.
Adhesive
Primer Coat: for rustproof, epoxy-based, Asahipen Corporation, product name: Ultra-quick-drying rust preventive
Top Coat: urethane-based, Cemedine Co., Ltd., UM700
Each of specimens was prepared as follows.
An iron plate surface was cleaned with methanol. The iron plate was coated with a primer coating rust preventive paint in a thickness of 0.2 mm with a brush, left and dried for 6 hours at a room temperature of 30° C. Thereafter, the plate was further coated with a top coating paint in a thickness of 0.2 mm with a brush. After dried for 10 minutes at a room temperature of 30° C., the plate was further covered with each of fabrics in a half-dry state and pressed by hand, and then left and dried.
Test Method
A vibration attenuation capacity (loss factor ($\eta$)) of each of the various attached materials was measured in reference to JIS G0602 "Vibration attenuation characteristic test method of damping steel sheet". Here, maximum values $X_0, X_1, \ldots X_n$ of response displacement were obtained from the damped free vibration waveform (FIG. 5) of bending vibration by cantilever impact vibration method (FIG. 4), and the loss factor was calculated (Mathematical Expression 1) from the inclination (tan $\theta$) of an approximate straight line obtained by plotting $X_{n+1}$ along the horizontal axis and $X_n$ along the vertical axis. Meanwhile, the calculation span (between $X_0$ and $X_n$) here was set in the range of 4.0 to 0.5 mm excluding the response displacement at initial impact.

Mathematical Expression (1)

$$\eta = 2 \cdot ln(\tan \theta)/\sqrt{((2\pi)^2 + [ln(\tan \theta)]^2)} \qquad (1)$$

<Measurement Conditions>
Cantilever Protruding Length: 200 mm
Vibration Point: cantilever free end side
Vibration Method: step-relaxation vibration
<Measurement Device>
CCD laser displacement meter (LK-GD5000, Keyence Corporation)
FFT analyzer (Photon II, AR BROWN Co., Ltd.)
Test results are shown in Table 9.

TABLE 9

Loss factor of test piece

| Sample name | | Loss factor [×10$^{-2}$] | Average of loss factor [×10$^{-2}$] | Natural frequency [Hz] |
|---|---|---|---|---|
| No fabric stuck (blank) | No. 1 | 0.51 | 0.51 | 12.0 |
| | No. 2 | 0.51 | | 12.1 |
| | No. 3 | 0.50 | | 12.0 |
| Fabric stuck (cotton) | No. 1 | 0.68 | 0.69 | 11.5 |
| | No. 2 | 0.65 | | 11.5 |
| | No. 3 | 0.73 | | 11.6 |
| Fabric stuck (polyester) | No. 1 | 0.76 | 0.83 | 11.5 |
| | No. 2 | 0.78 | | 11.5 |
| | No. 3 | 0.94 | | 11.6 |
| Fabric stuck (rayon) | No. 1 | 0.82 | 0.79 | 11.7 |
| | No. 2 | 0.79 | | 11.6 |
| | No. 3 | 0.76 | | 11.7 |

The damping effects of various fabric attachment materials having an iron plate as the base material were investigated by cantilever impact vibration method, and the following results were found under the present test conditions.

1) By attaching each of the fabrics of cotton, polyester, and rayon to an iron plate, the loss factor increased by about 1.4 to 1.6 times that of blank, and the vibration attenuation capacity was improved in any of the cases.

2) Of these materials, with each of the fabric attachment materials of polyester and rayon, the value (average value) of the loss factor was high at the same level. The vibration attenuation capacity was about 1.6 times that of blank. With the fabric attachment material of cotton, the vibration attenuation capacity was as high as 1.4 times.

DESCRIPTION OF THE REFERENCE SYMBOLS

1 Metal product surface
2 Rust preventive paint
3 Adhesive
4 Fabric
5 Polyethylene film
10 Iron plate
41 Laser displacement meter
42 Base material (iron plate)
43 Fabric attachment material
44 Fixture

The invention claimed is:

1. A method for inhibiting static electricity discharge of a metal product surface by processing a surface of a metal product comprising the steps of:
    applying a rust preventive paint to the surface of the metal product,
    applying an adhesive onto the rust preventive paint, and
    attaching a fabric onto the adhesive so as not to allow the adhesive to exude to an external surface of the fabric, wherein inhibiting static electrical discharge of a metal product surface,
    wherein the fabric constitutes the outermost layer,
    wherein the metal product is a conveyance, an iron or steel structure, a water-related product, a laundry rack, a handle, a wagon, an agricultural machine, a desk, a chair, or a writing implement, and
    wherein before the step of attaching a fabric onto the adhesive, the adhesive is in a half-dry state.

2. The method according to claim 1, wherein the rust preventive paint includes:
    (A) a rust preventive pigment; and
    (B) a resin selected from the group consisting of an epoxy resin (b1), a vinylated alkyd resin (b2), and a phenol-modified alkyd resin (b3).

3. The method according to claim 1 or 2, wherein the adhesive contains a urethane resin, chloroprene rubber, nitrile rubber, or an ethylene-vinyl acetate copolymer.

4. The method according to claim 1, wherein the metal product is made of iron or steel.

5. The method according to claim 1, wherein the fabric is made of cotton, rayon, or polyester.

6. The method according to claim 1, wherein the method is for the rust prevention, for the inhibition of static electricity discharge, or for the reduction of vibration of the metal product surface.

7. The method according to claim 1, wherein the fabric is a textile or knit, wherein the textile is a cloth made by combining yarn longitudinally and latitudinally and the knit is a cloth made from a yarn.

8. The method according to claim 1, wherein the fabric is a napped or flocked fabric.

9. The method according to claim 1, wherein the iron or steel structure is selected from the group consisting of a pier, a bridge, an iron pole, and a guardrail.

10. The method according to claim 9, wherein the rust preventive paint includes:
    (A) a rust preventive pigment; and
    (B) a resin selected from the group consisting of an epoxy resin (b1), a vinylated alkyd resin (b2), and a phenol-modified alkyd resin (b3).

11. The method according to claim 9, wherein the adhesive contains a urethane resin, chloroprene rubber, nitrile rubber, or an ethylene-vinyl acetate copolymer.

12. The method according to claim 9, wherein the metal product is made of iron or steel.

13. The method according to claim 9, wherein the fabric is made of cotton, rayon, or polyester.

14. The method according to claim 9, wherein the fabric is a textile or knit, wherein the textile is a cloth made by combining yarn longitudinally and latitudinally and the knit is a cloth made from a yarn.

15. The method according to claim 9, wherein the fabric is a napped or flocked fabric.

16. The method according to claim 1, wherein the metal product is selected from the group consisting of a conveyance, a bridge, an iron pole, a guardrail, and a water-related product.

* * * * *